US010111406B2

(12) United States Patent
Rogers et al.

(10) Patent No.: US 10,111,406 B2
(45) Date of Patent: Oct. 30, 2018

(54) STIMULANT INFUSED CAT SCRATCHER PRODUCTS

(71) Applicant: Worldwise, Inc., Novato, CA (US)

(72) Inventors: Tracy Rogers, McAllen, TX (US); Jacob Dominguez, Weslaco, TX (US); Andrew Murrer, Alamo, CA (US); Edgar Camara, McAllen, TX (US)

(73) Assignee: Worldwise, Inc., Novato, CA (US)

( * ) Notice: Subject to any disclaimer, the term of this patent is extended or adjusted under 35 U.S.C. 154(b) by 154 days.

(21) Appl. No.: 15/416,241

(22) Filed: Jan. 26, 2017

(65) Prior Publication Data

US 2018/0206451 A1 Jul. 26, 2018

(51) Int. Cl.
*A01K 15/02* (2006.01)
*B32B 7/12* (2006.01)
*B32B 29/00* (2006.01)
*B32B 29/08* (2006.01)
*C09J 103/02* (2006.01)
*C09J 11/06* (2006.01)
*C09J 11/04* (2006.01)

(52) U.S. Cl.
CPC .............. *A01K 15/024* (2013.01); *B32B 7/12* (2013.01); *B32B 29/005* (2013.01); *B32B 29/08* (2013.01); *C09J 11/04* (2013.01); *C09J 11/06* (2013.01); *C09J 103/02* (2013.01); *B32B 2250/42* (2013.01)

(58) Field of Classification Search
CPC .. A01K 15/024; A01K 15/025; A01K 13/004; A01K 15/02

USPC ................. 119/706, 707, 702, 711
See application file for complete search history.

(56) References Cited

U.S. PATENT DOCUMENTS

| | | | | | |
|---|---|---|---|---|---|
| 3,486,485 | A | * | 12/1969 | Kahanick | A01K 15/024 119/706 |
| 3,993,027 | A | * | 11/1976 | Mullin | A01K 15/024 119/706 |
| 5,275,127 | A | * | 1/1994 | Leopold | A01K 15/024 119/706 |
| 5,842,440 | A | * | 12/1998 | Bell, Jr. | A01K 13/004 119/621 |
| 5,875,737 | A | * | 3/1999 | Boshears | A01K 15/024 119/706 |
| 7,011,043 | B2 | * | 3/2006 | Diep | A01K 15/024 119/601 |

(Continued)

FOREIGN PATENT DOCUMENTS

JP 03022935 A * 1/1991
JP 09308404 A * 12/1997

(Continued)

*Primary Examiner* — Yvonne R Abbott-Lewis
(74) *Attorney, Agent, or Firm* — Bay Area Technology Law Group PC

(57) ABSTRACT

A cat scratcher is either in the form of a rigid support and cat scratcher surface or in the form of a body of corrugated cardboard. The corrugated cardboard body typically has a plurality of corrugated subparts, each corrugated subpart being a corrugated sheet having top and bottom surfaces and planar sheets of kraft paper adhered thereto through the use of an aqueous-based adhesive, the aqueous-based adhesive including a catnip or silver vine hydrosol. This same adhesive can be used to adhere a cat scratcher surface to its rigid support.

15 Claims, 3 Drawing Sheets

(56) References Cited

U.S. PATENT DOCUMENTS

| | | | | |
|---|---|---|---|---|
| 7,117,821 | B2* | 10/2006 | Novak | A01K 15/024 |
| | | | | 119/706 |
| D555,843 | S * | 11/2007 | Lika | D30/160 |
| 7,565,884 | B2* | 7/2009 | Lamstein | A01K 15/024 |
| | | | | 119/706 |
| 7,647,893 | B2* | 1/2010 | Kraus | A01K 1/0356 |
| | | | | 119/702 |
| 7,669,551 | B2* | 3/2010 | Lamstein | A01K 1/035 |
| | | | | 119/28.5 |
| 8,141,519 | B2* | 3/2012 | Salzman | A01K 15/024 |
| | | | | 119/482 |
| 8,561,575 | B2* | 10/2013 | Ruffin | A01K 15/024 |
| | | | | 119/706 |
| 8,578,890 | B1* | 11/2013 | Haaf | A01K 15/024 |
| | | | | 119/706 |
| 2005/0170040 | A1* | 8/2005 | Moulton | A01K 15/026 |
| | | | | 426/1 |
| 2013/0149418 | A1* | 6/2013 | Carlson | A01K 15/026 |
| | | | | 426/140 |
| 2014/0000531 | A1* | 1/2014 | Sumitsuji | A01K 15/025 |
| | | | | 119/707 |
| 2014/0014043 | A1* | 1/2014 | McCann | A01K 15/024 |
| | | | | 119/706 |
| 2016/0338320 | A1* | 11/2016 | Floyd | A01K 15/024 |

FOREIGN PATENT DOCUMENTS

| | | | | |
|---|---|---|---|---|
| JP | 2000069876 | A * | 3/2000 | |
| JP | 2003210061 | A * | 7/2003 | |
| JP | 2014057606 | A * | 4/2014 | A01K 1/035 |

* cited by examiner

STIMULANT INFUSED CAT SCRATCHER PRODUCTS

TECHNICAL FIELD

The present invention is directed to cat scratchers which include catnip or silver vine as an attractant to encourage a cat to use it as opposed to satisfying its natural scratching instinct on furniture, drapes and the like. Rather than merely applying catnip or silver vine to the surface of the scratcher, it has been determined that significant benefit can be realized by incorporating catnip or silver vine hydrosol alone or together with catnip or silver vine leaves or catnip or silver vine biomass into an aqueous-based adhesive used to attach a scratching surface to a rigid support or in the making of fluted cardboard bodies commonly employed as scratchers.

BACKGROUND OF THE INVENTION

It is quite important for the health and well-being of a pet to not only be fed properly but to also provide stimulating activities. Pets which become bored oftentimes become destructive not only of their surroundings but also of themselves. Animals which are not appropriately stimulated can actually suffer adverse health effects and as a consequence, proper pet stimulation is a significant consideration of virtually all pet owners.

In addition to pet stimulation, generally, pet cats require surfaces upon which they can scratch. If an appropriate scratching surface is not provided, cats will use any available surfaces, including upholstered furniture, drapes and rugs to satisfy their need to scratch potentially causing significant damage.

There have been a variety of cat scratching devices available in the marketplace for quite some time. The most successful of such devices have surfaces which will eventually be worn requiring replacement. Such surfaces include, for example, carpet, sisal, corrugated cardboard, rope and natural fibers.

To stimulate a pet cat and to encourage it to selectively use a dedicated scratching device rather than furniture, rugs, drapes and the like, it is common to apply raw catnip or silver vine in the form of ground catnip or silver vine leaves to the scratcher surface. The effect of catnip and silver vine on virtually all feline species is well known. The dry leaves of the catnip and silver vine plants express a mint-like scent. They are euphoric stimulants, although they are not toxic. This "catnip response" is due to the plants' active ingredient, nepetalactone. Similar response is observed as a result of silver vine's active ingredient actinidine.

When a cat smells catnip or silver vine, it characteristically exhibits a range of behaviors somewhat dependent upon the age of a cat, genetics, and whether it is capable of reproduction. Most reactions last from 5-to-15 minutes and include sniffing, licking and chewing, chin and cheek rubbing, hip and head-over roll and body rubbing. The feline receptor for the active ingredient, nepetalactone or actinidine, is contained within the animal's vomeronasal organ located above the feline palate. The location of the vomeronasal organ may explain why cats do not react from eating gelatin capsules of catnip. The nepetalactone and actinidine must be inhaled for it to reach the receptors in this organ.

As noted, when catnip and silver vine have been employed in the past, they have been applied in dry form or sprayed on as a derivative to the scratcher surface. Applied in this manner, they are readily consumable and relatively short lived due to their free access to the cat or other animal.

It is thus an object to the present invention to provide a cat scratcher which benefits from the use of catnip and silver vine but in a way to make them more effective over a prolonged period of time.

Recognizing that all scratchers use an adhesive in one form or another, it is an object to the present invention to incorporate catnip or silver vine into a suitable adhesive either used in the manufacture of cardboard bodies or to adhere scratcher materials to their rigid supports to prevent the cat from unfettered access to the catnip or silver vine source thus extending the life of the catnip or silver vine far longer than comparable products of the prior art.

These and further objects will be more readily apparent when considering the following disclosure and appended claims.

SUMMARY OF THE INVENTION

A cat scratcher comprising a body of corrugated cardboard, said corrugated cardboard comprising a plurality of corrugated subparts, each corrugated subpart comprising a corrugated sheet having top and bottom surfaces and a planar sheet of kraft paper adhered to said top surface and a sheet of kraft paper adhered to said bottom surface, said top and bottom surfaces being adhered to said sheets of kraft paper through the use of an aqueous-based adhesive, said aqueous-based adhesive comprising a catnip or silver vine hydrosol.

A cat scratcher comprising a rigid support and a cat scratching material adhered thereto, said cat scratching material being adhered to said rigid support through the use of an aqueous-based adhesive, said aqueous-based adhesive comprising a catnip or silver vine hydrosol.

An adhesive for use in the manufacture of a cat scratcher, said adhesive comprising an aqueous-based starch or dextrin composition admixed with catnip or silver vine hydrosol.

DETAILED DESCRIPTION OF THE INVENTION

Figure 1A:
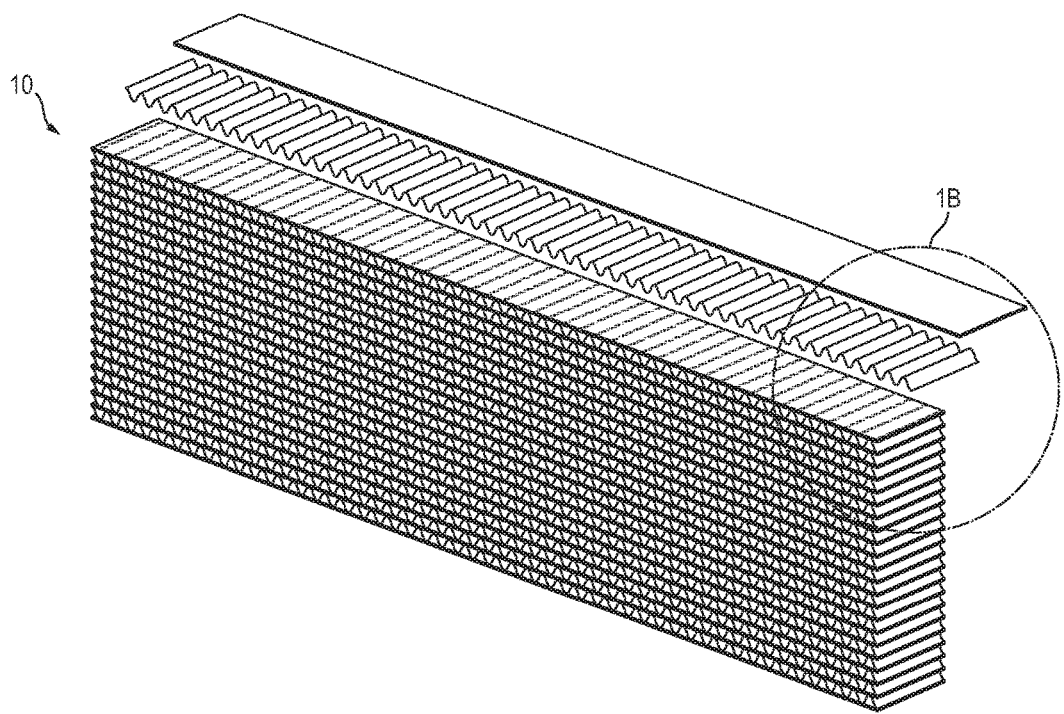
FIG. 1A is a perspective view of a first embodiment of the present invention, partially constructed.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 1B:
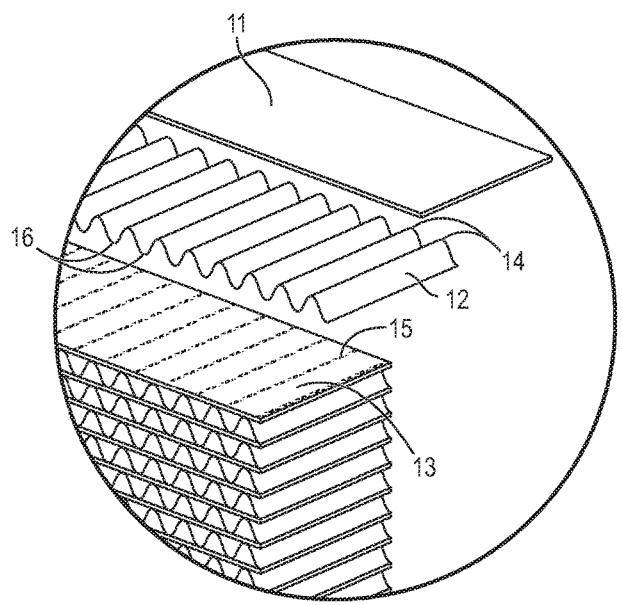
FIG. 1B is a perspective view of a detail of the first embodiment of FIG. 1A.

FIGS. 1A and 1B depict the present invention as it applies to cat scratcher body 10 of corrugated cardboard. As is typically the case, corrugated cardboard comprises a plurality of corrugated subparts, specifically, corrugated sheet 12 having peaks 14 and corresponding valleys 16 and planar sheets of kraft paper 11 and 13 separating each corrugated sheet. Beads of adhesive 15 are applied to the kraft paper such that when corrugated sheet 12 is positioned between opposing sheets of kraft paper 11 and 13, cardboard body 10 is fabricated as a singular block. Generally, starch or dextrin-based adhesives are employed as they are non-toxic and thus pose no health risk to an engaging cat. Typical of such adhesives are IFS Industries Durapro D100 TL dextrin adhesives and Gum-Tex Tylose Powder of Wilton Industries, Inc.

In the fabrication of prior cardboard-based scratchers, a common adhesive is employed to glue corrugated and planar sheets together and, if desired, ground catnip or silver vine leaves are sprinkled onto the flutes of the finished cardboard block. As the catnip or silver vine is readily available to the pet, it is readily dissipated and provides the scratcher with no long-term stimulating effects. As a solution to this deficiency inherent in prior scratchers, the present invention employs a catnip or silver vine hydrosol in a suitable aqueous-based adhesive to create beads 15. It has been found that, in doing so, the integrity of the adhesive is not compromised and yet the desired stimulating effects are available for virtually the entire life of the scratcher. A suitable composition for the intended adhesive is 48.4% (wt.) dextrin, 48.4% (wt.) catnip hydrosol and 3.1% (wt.) catnip biomass.

Catnip and silver vine hydrosol are produced by the steam distillation of catnip and silver vine plants. Such a process for catnip distillation has been known for quite some time, the most recent description being in U.S. Pat. No. 8,329,229, the disclosure which is incorporated by reference. Virtually the same process can be employed in the steam distillation of silver vine plants. The leaves of the plant are subject to steam distillation producing not only catnip or silver vine hydrosol but also catnip or silver vine biomass, the latter continuing to exhibit stimulating effects but being void of some of the catnip or silver vine oil which creates the hydrosol during the steam distillation process. The hydrosol component is separated for mixing with a suitable aqueous-based adhesive, the water in the aqueous-based adhesive being replaced by the aqueous catnip or silver vine hydrosol. Again, suitable such adhesives include starch and dextrin-based compositions which are chosen due to their non-toxic nature. Depending upon the desired strength and viscosity of the adhesive composition, one can also mix raw catnip or silver vine in the form of chopped leaves and/or the catnip or silver vine biomass resulting from the distillation process into the adhesive composition.

Figure 4:
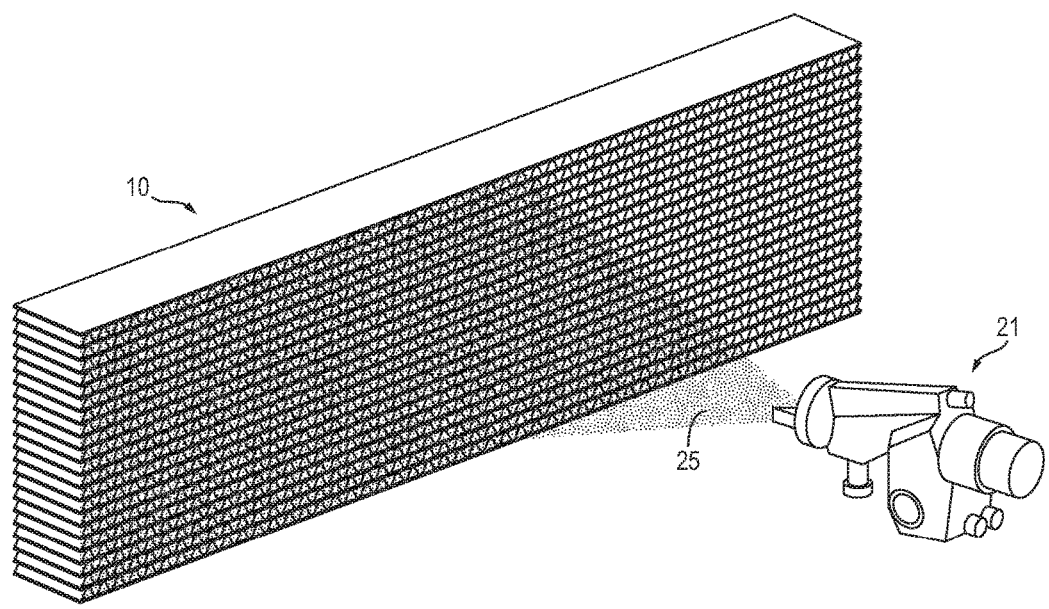
FIG. 4 depicts the perspective view of the completed first embodiment of the present invention.

Furthermore, if desired, as noted in reference to FIG. 4, catnip or silver vine hydrosol, alone, or with chopped catnip leaves and/or catnip biomass resulting from the distillation process described above can be sprayed onto the surface of scratcher body 10 employing, for example, an HVLP automatic spray gun to provide catnip or silver vine within the flutes created by corrugated sheets 12. This further enhances the stimulating effects of the scratcher noting that the catnip or silver vine hydrosol penetrates deeply within the flutes and, being a liquid, is absorbed by kraft paper sheets 11 and 13 as well as corrugated sheet 12. Solids, in the nature of chopped catnip or silver vine leaves and/or catnip or silver vine biomass can be included with the catnip or silver vine hydrosol to vary the viscosity of spray 25 to prevent the spray from passing through scratcher body 10 without residing within the flutes as desired. A suitable composition for the stimulating spray is 27.1% (wt.) catnip hydrosol and 16.6% (wt.) catnip biomass.

Figure 2:
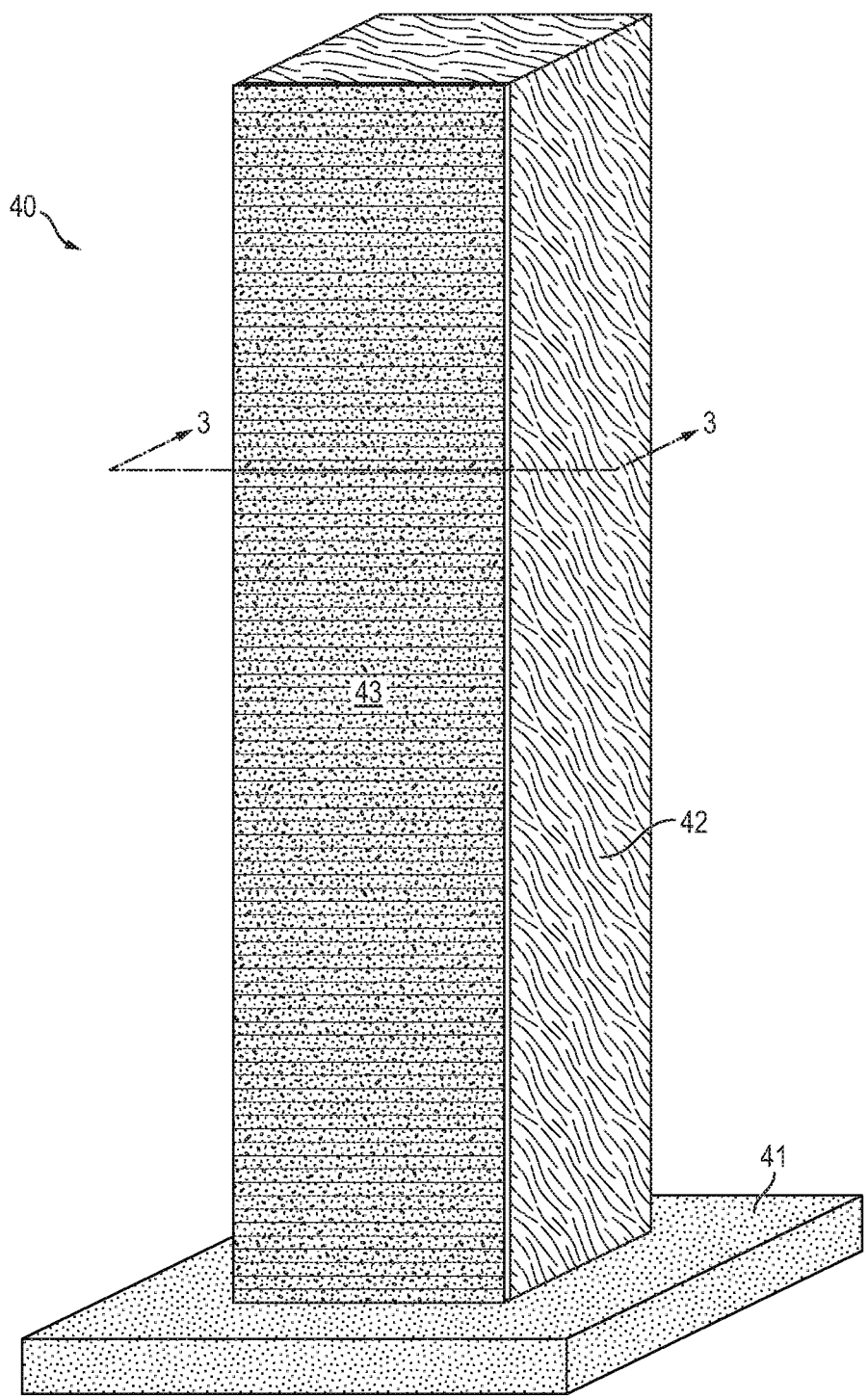
FIG. 2 is a perspective view of a typical self-supporting cat scratcher which is capable of being constructed employing the present invention.
Figure 3:
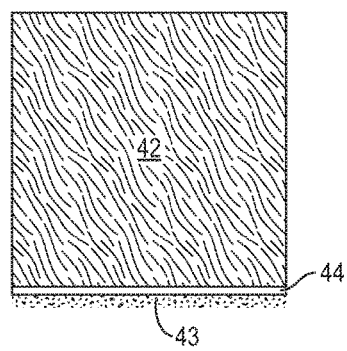
FIG. 3 is a cross-sectional view of the cat scratcher of FIG. 2 taken along line 3-3.

Not surprisingly, the present invention is not limited strictly to the fabrication of cardboard-based scratchers. Self-supporting scratchers such as that depicted in FIG. 2 can also benefit from the present invention. Scratcher 40 is typical of such scratcher products. In this instance, base 41 is provided to reside upon a flat surface such as the floor of the pet owner's residence while vertical column 42 extends there from. One or more surfaces of vertical column 42, composed of, for example, wood or composite, as well as the surface of base 41, can be covered with a suitable cat scratching material 43. Typical cat scratching materials commonly employed include cardboard, carpet, sisal, rope and natural fibers. As was the case with scratcher body 10 (of cardboard), when it is desired to enhance a scratcher by including catnip or silver vine as an attractant, manufacturers would generally fabricate scratcher 40 and simply dust chopped catnip or silver vine leaves on the surface of cat scratching material 43. However, as noted previously, as the cat has unimpeded access to such surface-applied catnip or silver vine leaves, the stimulating effects are readily dissipated and thus have no long-term viability.

In order to improve those cat scratchers described above, the present invention employs adhesive layer 44 for adhering scratching material 43 to column 42 and, if desired, to base 41. Adhesive layer 44 can be composed of an aqueous-based adhesive, such as a starch or dextrin based-adhesive employing catnip or silver vine hydrosol as the aqueous component of the composition. Further, as was the case previously, if a manufacturer wishes to increase the viscosity or strength of the glue composition, chopped catnip or silver vine leaves and/or catnip or silver vine biomass produced from the steam distillation of catnip or silver vine can be used as well. In such a configuration, the effects of catnip or silver vine are readily available to the pet as the stimulating aroma passes through scratching material 43 while scratching material 43 prevents the pet from gaining direct access to it. Thus, the stimulating effects inherent in the production of cat scratcher 40 last much longer than those of the prior art. Also, as was the case in enhancing the stimulating effects of cardboard body 10 (FIG. 4) a catnip or silver vine hydrosol-based liquid can be sprayed onto cat scratching material 43 if desired.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat scratcher comprising a body of corrugated cardboard, said corrugated cardboard comprising a plurality of corrugated subparts, each corrugated subpart comprising a corrugated sheet having top and bottom surfaces and a planar sheet of kraft paper adhered to said top surface and a sheet of kraft paper adhered to said bottom surface, said top and bottom surfaces being adhered to said sheets of kraft paper through the use of an aqueous-based adhesive, said aqueous-based adhesive comprising a catnip or silver vine hydrosol.

2. The cat scratcher of claim 1 wherein said catnip or silver vine hydrosol comprises of product produced from the steam distillation of catnip or silver vine leaves, said steam distillation also producing solid catnip or silver vine biomass.

3. The cat scratcher of claim 1 wherein said corrugated sheet is characterized as having flutes created by said corrugations therein, said flutes being exposed when said cat scratcher is in use.

4. The cat scratcher of claim 3 wherein catnip or silver vine hydrosol has further been sprayed into said flutes.

5. The cat scratcher of claim 1 wherein said aqueous-based adhesive further comprises a member selected from the group consisting of catnip or silver vine leaves and catnip or silver vine biomass to increase the viscosity thereof.

6. The cat scratcher of claim 4 wherein said aqueous-based adhesive further comprises a member selected from the group consisting of catnip or silver vine leaves and catnip or silver vine biomass to increase the viscosity thereof.

7. The cat scratcher of claim 1 wherein said aqueous-based adhesive is selected from a member consisting of starch and dextrin-based adhesives.

8. A cat scratcher comprising a rigid support and a cat scratching material adhered thereto, said cat scratching material being adhered to said rigid support through the use of an aqueous-based adhesive, said aqueous-based adhesive comprising a catnip or silver vine hydrosol.

9. The cat scratcher of claim 8 wherein said cat scratching material comprises a member selected from the group consisting of cardboard, carpet, sisal, rope and natural fibers.

10. The cat scratcher of claim 8 wherein said catnip or silver vine hydrosol comprises a product produced from the steam distillation of catnip or silver vine leaves, said steam distillation also producing solid catnip or silver vine biomass.

11. The cat scratcher of claim 10 wherein said aqueous-based adhesive further comprises a member selected from the group consisting of catnip or silver vine leaves and catnip or silver vine biomass to increase the viscosity thereof.

12. The cat scratcher of claim 8 wherein said aqueous-based adhesive is selected from a member consisting of starch and dextrin-based adhesives.

13. An adhesive for use in the manufacture of a cat scratcher, said adhesive comprising an aqueous-based starch or dextrin composition admixed with catnip or silver vine hydrosol.

14. The adhesive of claim 13 wherein said catnip or silver vine hydrosol comprises a product produced from the steam distillation of catnip or silver vine leaves, said steam distillation also producing solid catnip or silver vine biomass.

15. The adhesive of claim 14 further comprising a member selected from the group consisting of catnip or silver vine leaves and catnip or silver vine biomass.

* * * * *